United States Patent

Chen

[11] Patent Number: 6,086,170
[45] Date of Patent: Jul. 11, 2000

[54] COMBINATION COMPACT DISK STORAGE BOX

[76] Inventor: Winallin Chen, No. 1, Chu Wei Lane, Erh Lin Chen, Changhwa Hsien, Taiwan

[21] Appl. No.: 09/240,702

[22] Filed: Feb. 2, 1999

[51] Int. Cl.[7] .................................................. A47B 81/06
[52] U.S. Cl. ...................... 312/9.11; 312/9.42; 312/9.57; 312/334.3; 312/111
[58] Field of Search .................................. 312/9.11, 9.9, 312/9.41, 9.42, 9.47, 9.48, 9.57, 9.63, 319.1, 334.3, 333, 350, 108, 111; 211/40, 41.12; 206/387.12, 308.1

[56] References Cited

U.S. PATENT DOCUMENTS

| 735,277 | 8/1903 | Lehmann | 312/334.3 X |
|---|---|---|---|
| 4,635,763 | 1/1987 | Omata | 312/319.1 X |
| 4,811,995 | 3/1989 | Ackeret | 312/9.63 |
| 5,690,221 | 11/1997 | Yeh | 312/9.16 X |
| 5,819,929 | 10/1998 | Chung | 206/308.1 |
| 5,819,930 | 10/1998 | Yu | 206/308.1 |

*Primary Examiner*—Janet M. Wilkens
*Attorney, Agent, or Firm*—Varndell & Varndell, PLLC

[57] ABSTRACT

A combination compact disk storage box includes a bottom shell, a top cover shell, and a plurality of indiviudal compact disk holder units arranged in a stack between the bottom shell and the top cover shell for holding individual compact disks respectively, wherein each individual compact disk holder unit includes a holder base, a sliding compact disk carriage moved in and out of the holder base for holding a individual compact disk, and a linkage coupled between the holder base and the sliding compact disk carriage for enabling the sliding compact disk carriage to be moved in and out of the holder base.

7 Claims, 8 Drawing Sheets

COMBINATION COMPACT DISK STORAGE BOX

BACKGROUND AND SUMMARY OF THE INVENTION

The present invention relates to compact disk storage means, and more particularly to a combination compact disk storage box which is comprised of a plurality of individual compact disk holder units arranged in a stack between a bottom shell and a top cover shell. Each individual compact disk holder unit is comprised of a holder base, a sliding compact disk carriage moved in and out of the holder base, and a linkage coupled between the holder base and the sliding compact disk carriage to automatically push the sliding compact disk carriage out of the holder base upon unlocking of the sliding compact disk carriage.

A compact disk is a good stroage medium storing a variety of data for the advantage of high stability. Every individual compact disk must be well protected against water, dust, etc. A variety of compact disk storage devices have been disclosed, and have appeared on the market. Individual compact disk storage cases are most commonly used for keeping compact disks individually. A regular individual compact disk strage case is comprised of two plastic shells pivoted together. When storing an individual compact disk in one individual compact disk storage case, the user must open the plastic shells from each other with both hands. Further, in order to keep a number of individual compact disk storage cases in order, an additional rack means or storage box means shall be used.

It is the main object of the present invention to provide a combination compact disk storage box which enables the user to conveniently store compact disks in good order and, to conveniently pick up storage compact disks. According to one aspect of the present invention, the combination compact disk storage box comprises a bottom shell, a top cover shell, and a plurality of individual compact disk holder units arranged in a stack between the bottom shell and the top cover shell for holding individual compact disks respectively, wherein each individual compact disk holder unit includes a holder base, a sliding compact disk carriage moved in and out of the holder base for holding a individual compact disk, and a linkage coupled between the holder base and the sliding compact disk carriage for enabling the sliding compact disk carriage to be moved in and out of the holder base. According to another aspect of the present invention, the linkage comprises spring means, which imparts a pulling force to links of the linkage, causing the sliding compact disk carriage to be automatically pushed out of the holder base when the sliding compact disk carriage is unlocked. According to another aspect of the present invention, the bottom shell comprises a plurality of upright hooks bilaterally raised from a top side wall thereof, the top cover shell comprises a plurality of recessed retaining portions corresponding to the upright hooks at the bottom shell, and the holder base of each individual compact disk holder unit comprises a plurality of top upright hooks and a plurality of bottom recessed retaining portions. The upright hooks and recessed retaining portions of the holder base of each individual compact disk holder unit are so arranged that the upright hooks of the holder base of one individual compact disk holder unit can be respectively hooked on the recessed retaining portions at another individual compact disk holder unit of the top cover shell, and the recessed retaining portions of the holder base of one individual compact disk holder unit can be respectively forced into engagement with the upright hooks at another individual compact disk holder unit or the bottom shell.

DETAILED DESCRIPTION OF THE PREFERRED EMBODIMENT

Figure 1:
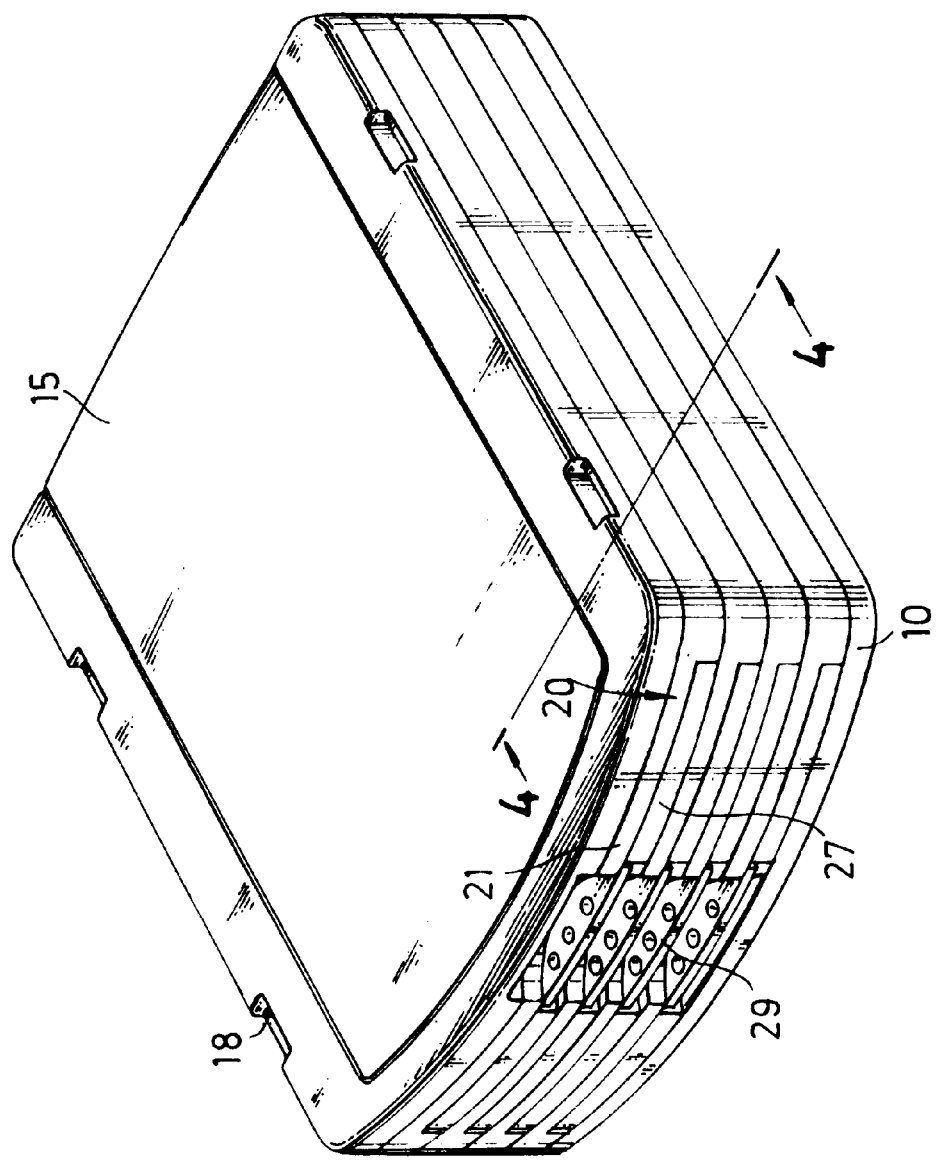
FIG. 1 is a perspective view of a combination compact disk storage box arranged according to the present invention.
Figure 2:
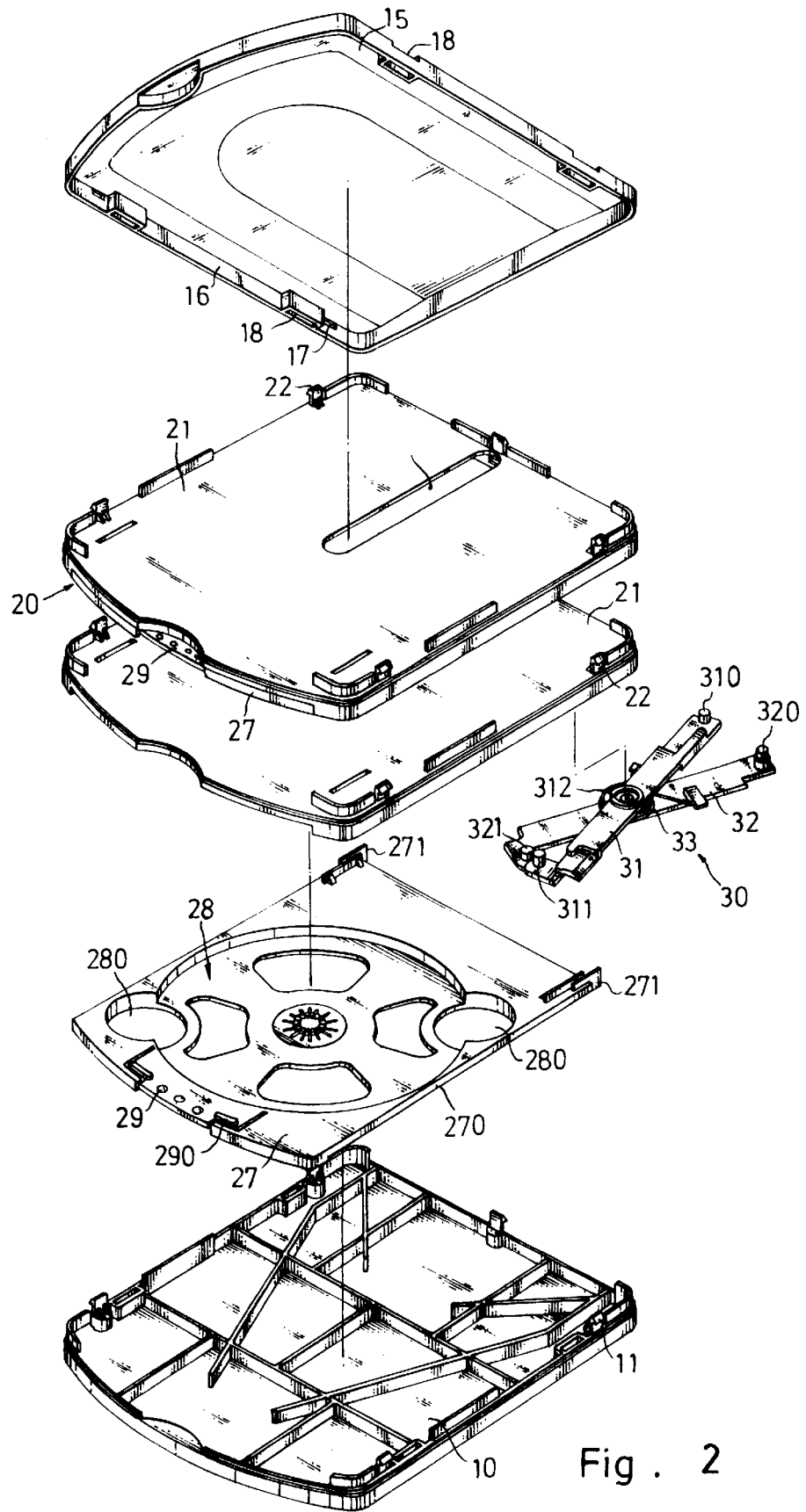
FIG. 2 is an exploded view of the present invention.

Referring to FIGS. 1. 2 and 3, a combination compact disk storage box in accordance with the present invention is generally comprised of a bottom shell 10, a top cover shell 15, and a plurality of individual compact disk holder units 20 arranged in a stack between the bottom shell 10 and the top cover shell 15.

Referring to FIGS. from 1 through 3 again, the bottom shell 10 is a disk-like shell having a plurality of upright hooks 11 spaced around the border thereof for securing one individual compact disk holder unit 20 to the inside of the bottom shell 10. The top cover shell 15 is a flat shell having a vertical peripheral flange 16 raised from the bottom side wall thereof around its border, a plurality of recessed retaining portions 17 spaced at the peripheral flange 16 on the inside for securing one individual compact disk holder unit 20 to the inside of the top cover shell 15, and a plurality of vertical locating holes 18 symmetrically provided at two opposite lateral sides thereof for the positioning of substantially U-shaped clamps 19 (see also FIG. 9).

Figure 3:
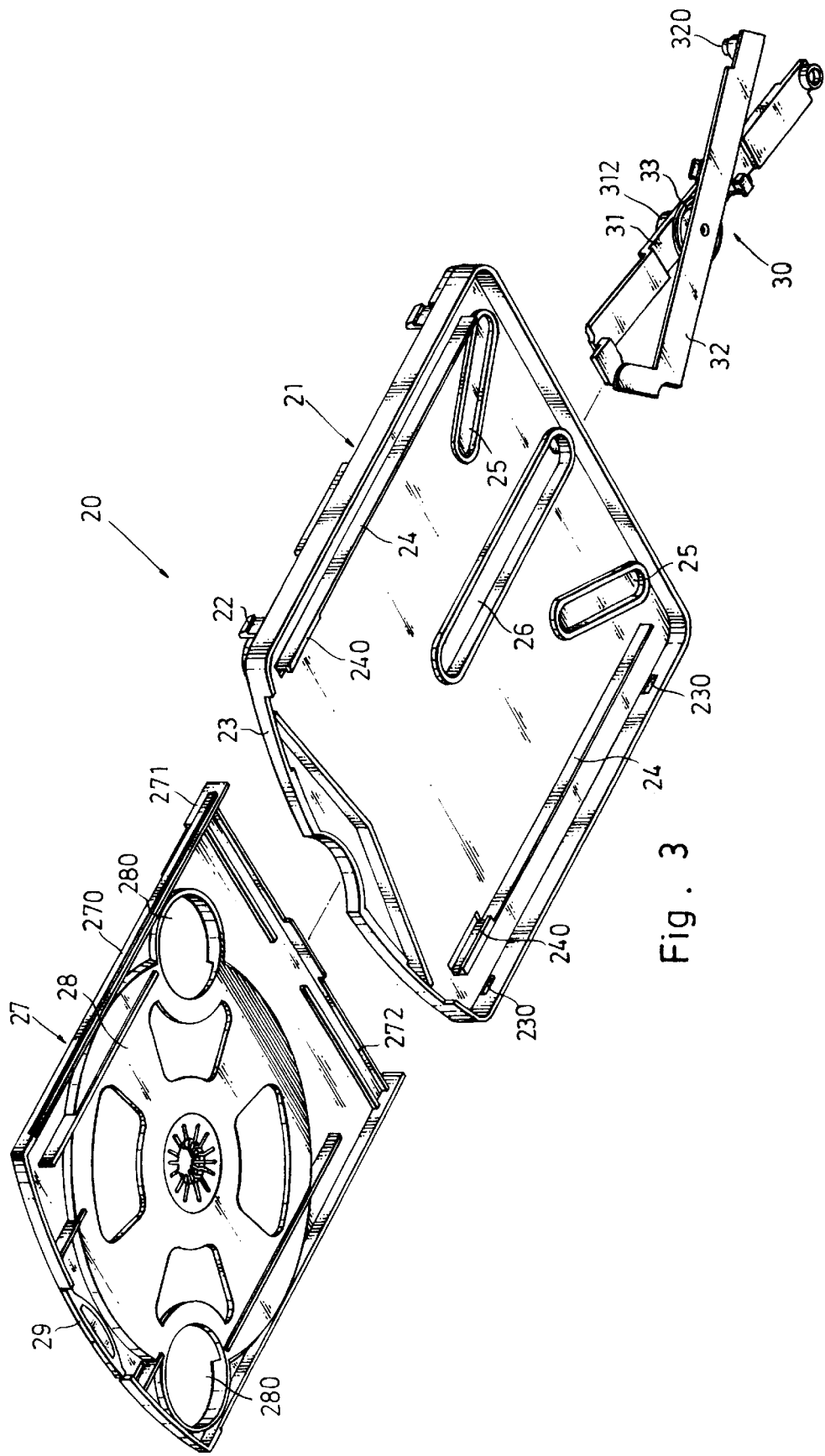
FIG. 3 is an exploded view of an individual compact disk holder unit for a combination compact disk storage box according to the present invention.
Figure 5:
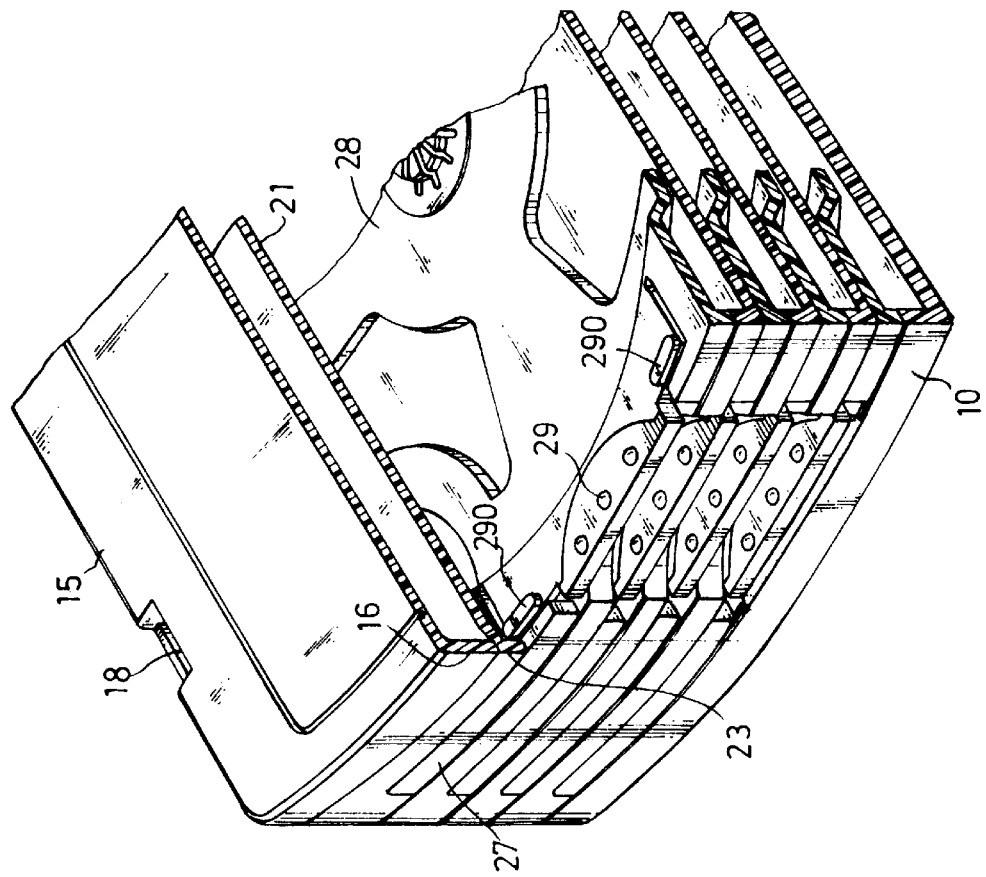
FIG. 5 is a cutaway view of the present invention.
Figure 4:
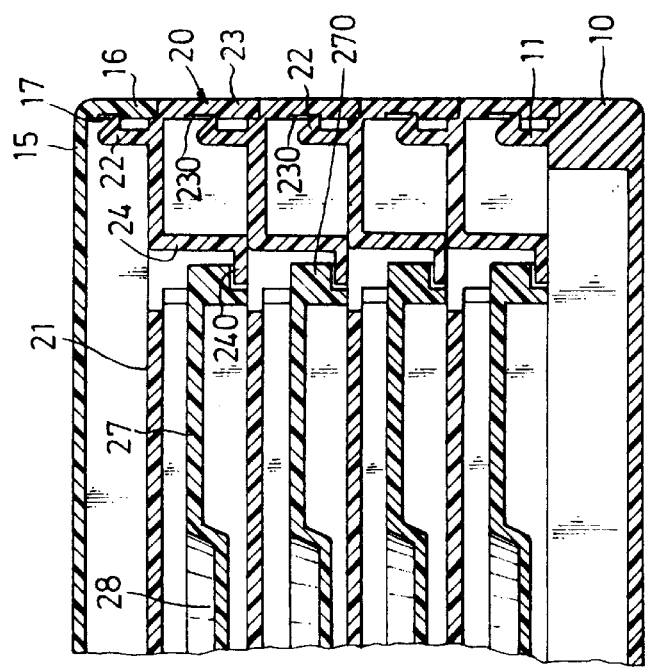
FIG. 4 is a sectional view of the present invention taken along line 4—4 of FIG. 1.

Referring to FIGS. 4 and 5 and FIGS. from 1 through 3 again, the individual compact disk holder units 20 each are comprised of a holder base 21, a sliding compact disk carriage 27 moved in and out of the holder base 21, and a linkage 30 coupled between the holder base 21 and the sliding compact disk carriage 27. The holder base 21 comprises a plurality of upright hooks 22 raised from the top side wall thereof corresponding to the recessed retaining portions 17 at the top cover shell 15 that can be respectively hooked on the recessed retaining portions 17, enabling the respective individual compact disk holder unit 20 to be secured to the top cover shell 15 on the inside (see FIG. 4), a vertical peripheral flange 23 raised from the bottom side wall thereof around its border, a plurality of recessed retaining portions 230 spaced at the peripheral flange 23 on the inside that can be forced into engagement with the upright hookes 11 at the bottom shell 10, enabling the respective individual compact disk holder unit 20 to be secured to the bottom shell 10 on the inside (see FIGS. 3 and 4), two parallel rails 24 longitudinally provided at its bottom side wall for guiding reciprocating movement of the sliding compact disk carriage 27, two stop blocks 240 respectively provided at the parallel rails 24 at one end to limit forward movement of the sliding compact disk carraige 27 in the holder base 21, a longitudinal sliding slot 26 equally spaced between the parallel rails 24 near its rear side, and two oblique sliding grooves 25 symmetrically provided at its bottom side wall and bilaterally spaced between the parallel rails 24 and the longitudinal sliding slot 26. The sloding compact disk carriage 27 is moved in and out of the holder base 21 at the bottom side between the parallel rails 24, comprising two longitudinal side flanges 270 provided at two opposite lateral sides thereof and moved with the sliding compact disk carriage 27 between the parallel rails 24 at the bottom side of the holder base 21, two stop blocks 271 respectively provided at the longitudinal side flanges 270 at one end that are respectively stopped at the stop blocks 240 at the holder base 21 to limit the forward stroke of the sliding compact disk carriage 27 relative to the holder base 21, a recessed receiving portion 28 at the top side wall thereof for holding a compact disk, a plurality of finger holes 280 provided at the border area of the recessed receiving portion 28 at two opposite locations for the insertion of the fingers of pick up the storage compact disk from the recessed receiving portion 28, a springy retaining strip 29 provided at a front side, two retaining portions 290 bilaterally raised from the springy retaining strip 29 that are forced into engagement with the peripheral flange 23 of the holder base 21 to hold the sliding compact disk carriage 27 in position when the sliding compact disk carriage 27 is pushed back to the inside of the holder base 21 (see FIG. 5), and a transverse sliding groove 272 at the bottom side wall thereof at a rear side remote from the springy retaining strip 29. The linkage 30 comprises a pviot pin 312 inserted through the longitudinal sliding slot 26 at the holder base 21, a first link 31 turned about the pivot pin 312, the first link 31 having a front end rod 311 slidably coupled to the transverse sliding groove 272 at the sliding compact disk carriage 27 and a rear end rod 310 slidably coupled to one oblique sliding groove 25 at the holder base 21, a second link 32 turned about the pivot pin 312 and crossed to the first link 31, the second link 32 having a front end rod 321 slidably coupled to the transverse sliding groove 272 at the sliding compact disk carriage 27 and a rear end rod 320 slidably coupled to one oblique sliding groove 25 at the holder base 21, and a torsional spring 33 mounted on the pivot pin 312 and connected between the links 31 and 32. The torsional spring 33 imparts a pulling force to the links 31 and 32, causing the rear ends of the links 31 and 32 to be closed together.

Figure 8:
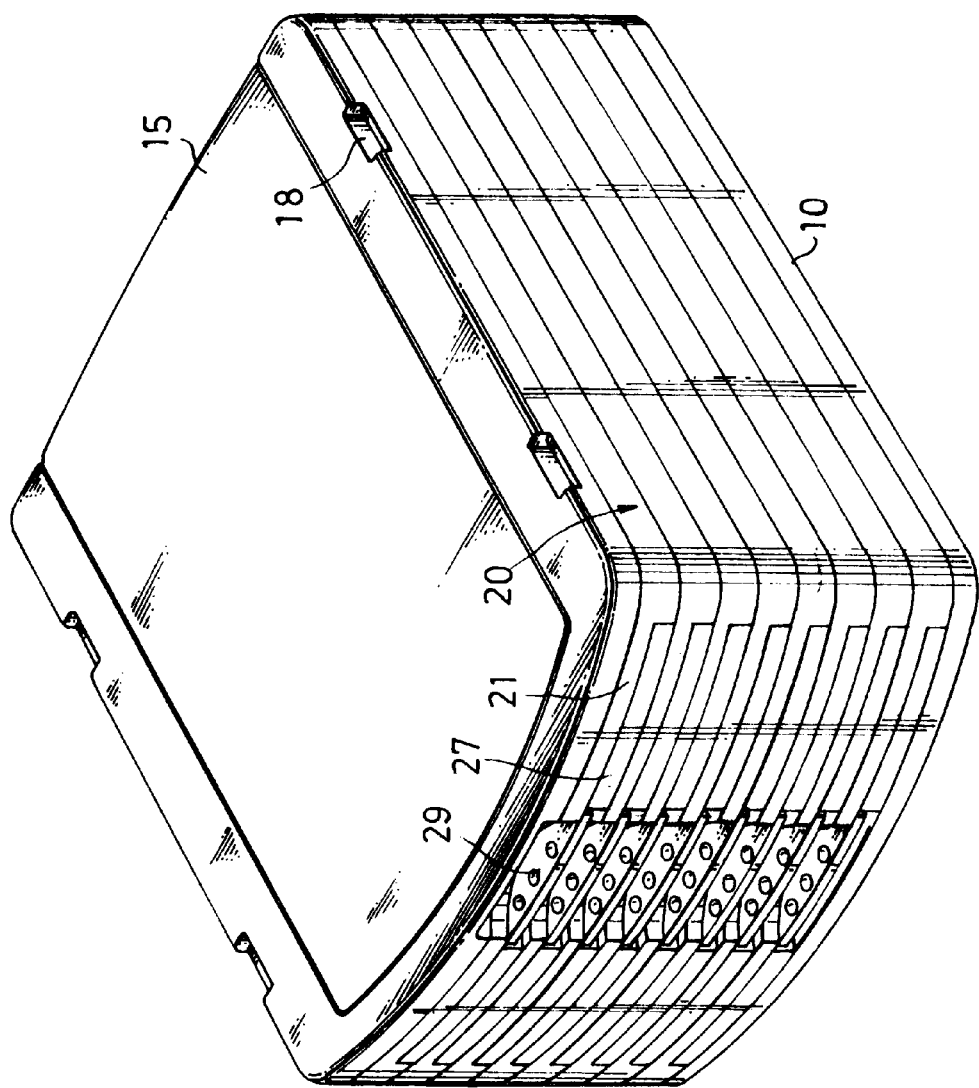
FIG. 8 is similar to FIG. 1 but showing the number of individual compact disk holder units increased.

Referring to FIG. 8 and FIGS. from 1 through 5 again, the assembly process of each individual compact disk holder unit 20 is outlined hereinafter. The sliding compact disk carriage 27 is inserted in between the parallel rails 24 at the bottom side of the holder base 21, permitting the stop blocks 271 at the longitudinal side flanges 270 of the sliding compact disk carriage 27 to be respectively stopped behind the stop blocks 240 at the parallel rails 24 of the holder base 21, then the linkage 30 is coupled between the sliding compact disk carriage 27 and the holder base 21, permitting the front end rods 311 and 321 to be respectively slidably coupled to the transverse sliding groove 272 at the sliding compact disk carriage 27 and the rear end rods 310 and 320 to be respectively slidably coupled to the oblique sliding grooves 25 at the holder base 21, then the sliding compact disk carriage 27 is pushed backwards and received inside the holder base 21. When the sliding compact disk carriage 27 is pushed backwards and received inside the holder base 21, the retaining portions 290 of the sliding compact disk carriage 27 are forced into engagement with the peripheral flange 23 of the holder base 21 to hold the sliding compact disk carriage 27 inside the holder base 21. By hooking the upright hooks 22 at the holder base 21 of one individual compact disk holder unit 20 on the recessed retaining portions 230 at the holder base 21 of another, a plurality of individual compact disk holder units 20 are fastened together in a stack. When a number of individual compact disk holder units 20 are arranged in a stack, the individual compact disk holder units 20 are retained between the bottom shell 10 and the top cover shell 15, permitting the upright hooks 11 of the bottom shell 10 to be respectively hooked on the recessed retaining portions 230 at the bottom-sided individual compact disk holder unit 20, and the upright hooks 22 of the holder base 21 of the top-sided individual compact disk holder unit 20 to be respectively hooked on the recessed retaining portions 17 at the top cover shell 15.

Figure 6:
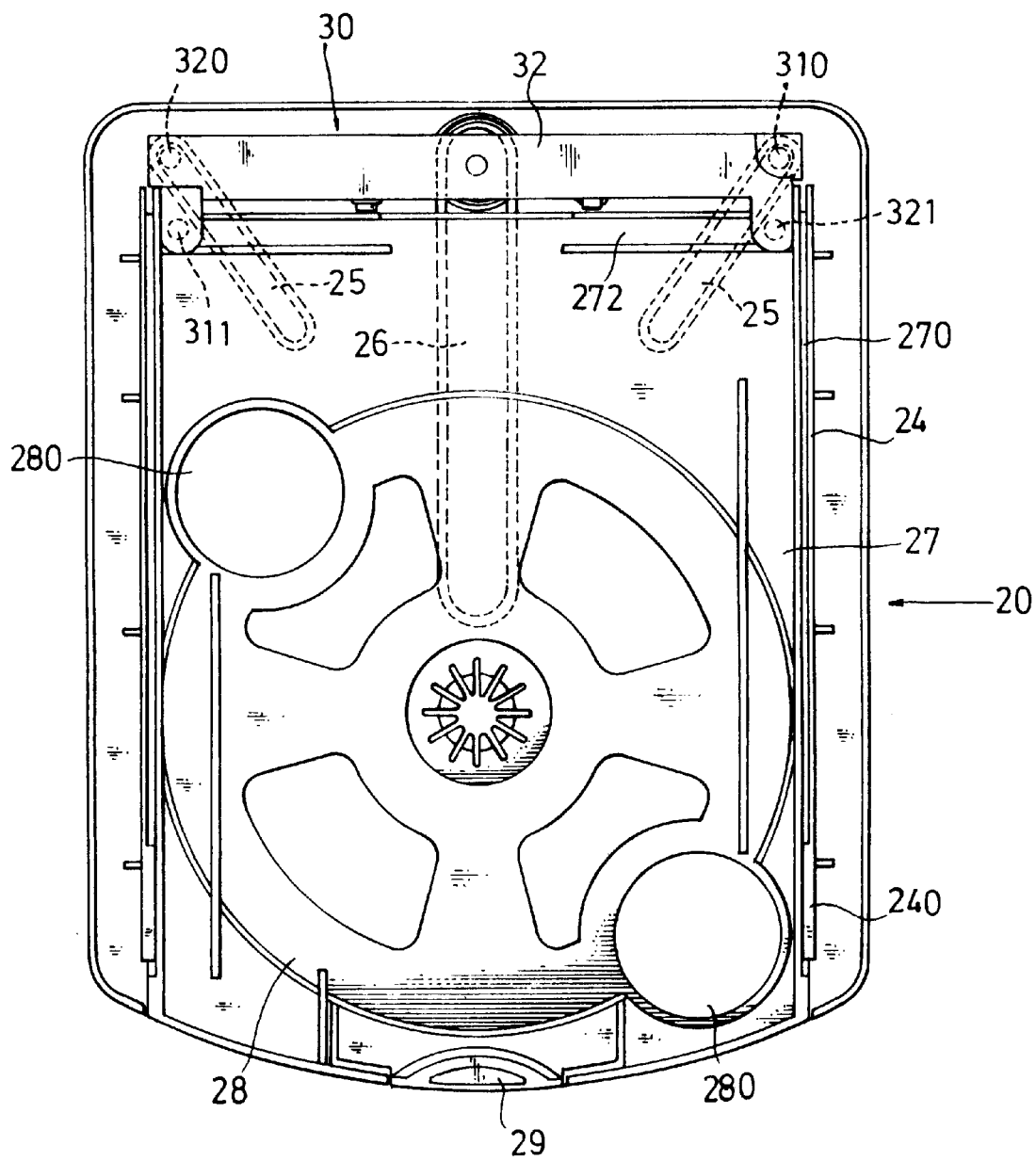
FIG. 6 is a top plain view of one individual compact disk holder unit according to the present invention, showing the sliding compact disk carriage received inside the holder base.
Figure 7:
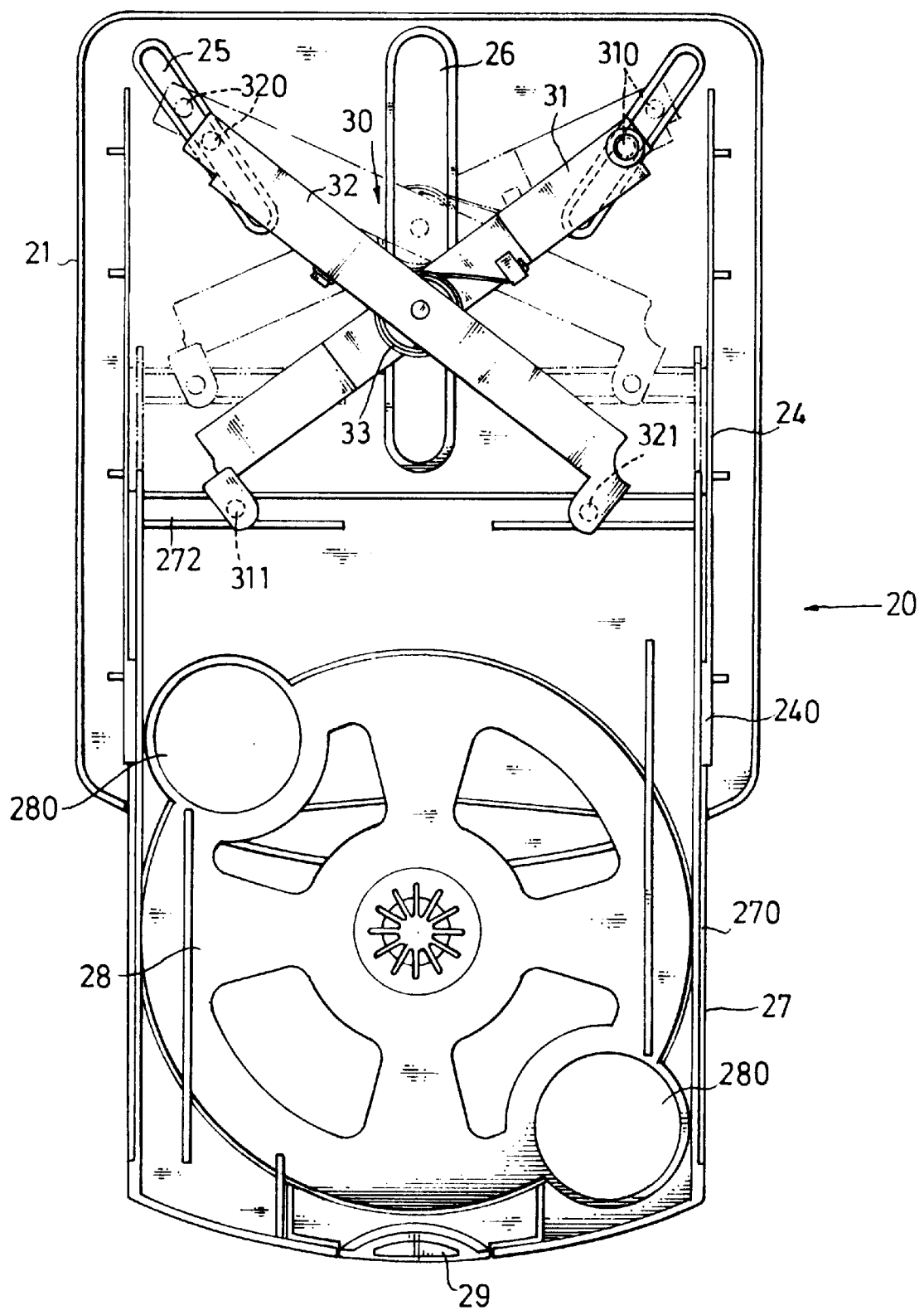
FIG. 7 is another top plain view of the individual compact disk holder unit, showing the sliding compact disk carriage extended out of the holder base.

Referring to FIGS. 6 and 7, when the springy retaining strip 29 of the sliding compact disk carriage 27 of one individual compact disk holder unit 20 is pressed downwards, the retaining portions 290 of the sliding compact disk carriage 27 are disengaged from the peripheral flange 23 of the holder base 21, the links 31 and 32 of the linkage 30 are pulled up by the torsional sping 33, and the front end rods 311 and 321 and rear end rods 310 and 320 are respectively moved along the transverse sliding groove 272 at the sliding compact disk carriage 27 and the oblique sliding grooves 25 at the holder base 21, thereby causing the sliding compact disk carriage 27 to be extended out of the holder base 21 from the position shown compact disk is put in the recessed receiving portin 28 at the sliding compact disk carriage 27, or the storage compact disk carriage 27, or the storage is picked up from the recessed receiving portion 28 at the sliding compact disk carriage 27, the sliding compact disk carriage 27 is then pushed backwards and received inside the holder base 21.

Figure 9:
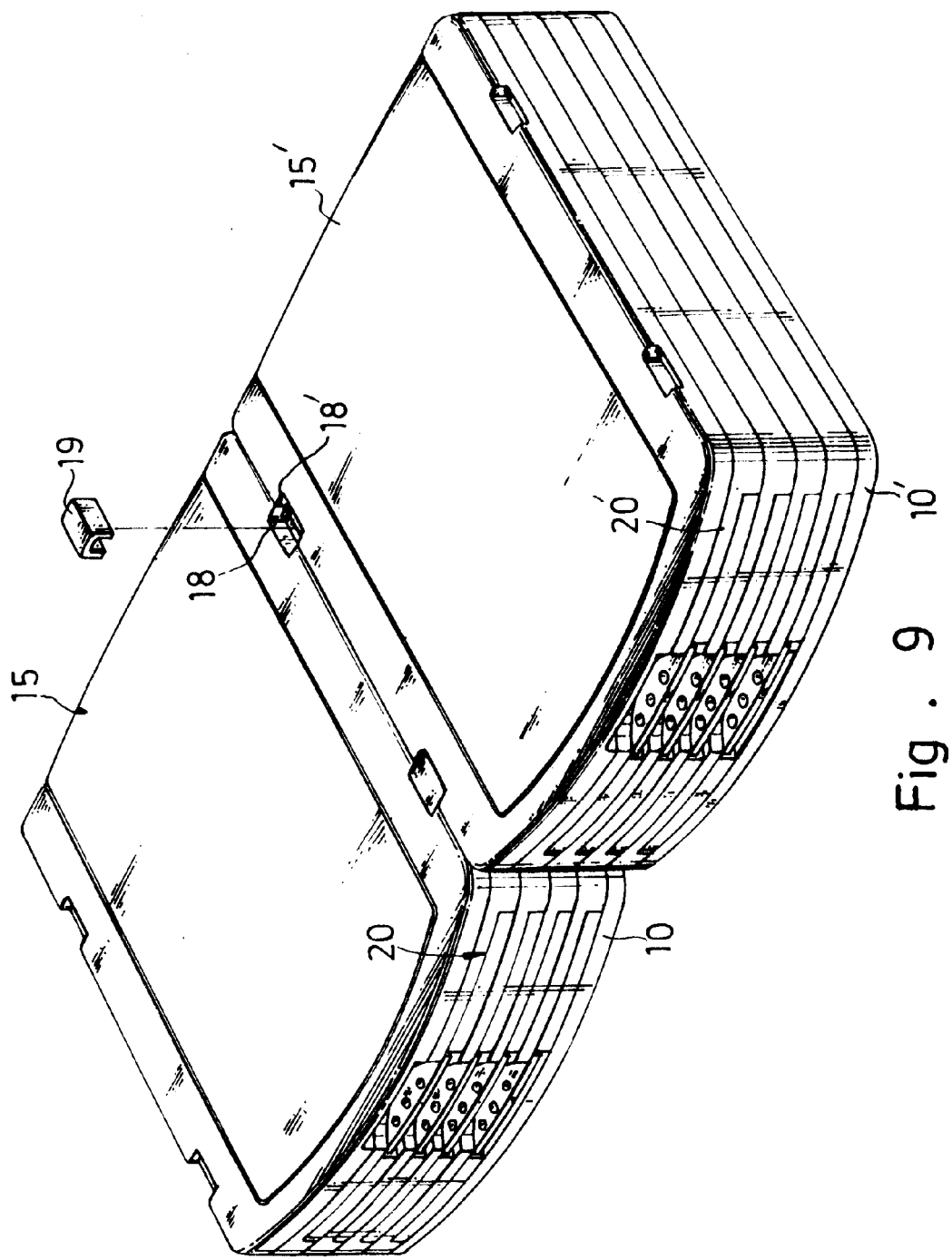
FIG. 9 shows two combination compact disk storage boxes fastened together side by side.

Referring to FIG. 9, when two combination compact disk storage boxes, respectively having bottom shells 10 and 10' and disk holder units 20 and 20', are put together side by side, u-shaped clamps 19 are respectively fastened to the vertical locating holes 18 and 18' at the adjacent sides of the top cover shells 15 and 15' of the two combination compact disk storage boxes to secure them together.

What is claimed is:

1. A compact disk storage box comprising a bottom shell, a top cover shell, and a plurality of individual compact disk holder units arranged in a stack between said bottom shell and said top cover shell for holding individual compact disks respectively, wherein said individual compact disk holder units each comprise:

a holder base, said holder base comprising a vertical peripheral flange raised from a bottom side wall thereof, a longitudinal sliding slot longitudinally provided on the middle, and two oblique sliding grooves symmetrically provided at the bottom side wall and bilaterally spaced from said longitudinal sliding slot at two opposite sides;

a sliding compact disk carriage moved in and out of said holder base for holding an individual compact disk, said sliding compact disk carriage comprising a springy retaining strip provided at a front side thereof, two retaining portions bilaterally raised from said springy retaining strip that are forced into engagement with the peripheral flange of said holder base to hold said sliding compact disk carriage in position when said sliding compact disk carriage is pushed back to the inside of said holder base, and a transverse sliding groove at a bottom side wall thereof at a rear side remote from said springy retaining strip; and a linkage coupled between said holder base and said sliding compact disk carriage for enabling said sliding compact disk carriage to be moved in and out of said holder base, said linkage comprising pivot pin inserted through the longitudinal sliding slot at said holder base, a first link turned about said pivot pin, said first link having a front end rod slidably coupled to the transverse sliding groove at said sliding compact disk carriage and a rear end rod slidably coupled to one oblique sliding groove at said holder base, a second link turned about the pivot pin and crossed to said first link, said second link having a front end rod slidably coupled to the transverse sliding groove at said sliding compact disk carriage and a rear end rod slidably coupled to one oblique sliding groove at said holder base, and a torsional spring mounted on said pivot pin and connected between said first link and said second link to pull rear ends of said first link and said second link together, enabling said sliding compact disk carriage to be extended out of said holder base.

2. The compact disk storage box of claim 1 wherein each said holder base comprises two longitudinal rails arranged in parallel at its bottom side wall and defining a sliding space in which a respective said sliding compact disk carriage is moved, and said respective sliding compact disk carriage comprises two longitudinal side flanges moved with said respective sliding compact disk carriage in the sliding space between the longitudinal rails at said holder base.

3. The compact disk storage box of claim 2 wherein each said holder base comprises two stop blocks respectively provided at the longitudinal rails at said holder base at a front side to limit forward movement of a respective said sliding compact disk carriage, and said respective sliding compact disk carriage comprises two stop blocks bilaterally disposed at said rear side thereof which are respectively stopped behind the stop blocks at said holder base to limit forward movement of said respective sliding compact disk carriage when said respective sliding compact disk carriage is extended out of said holder base.

4. The compact disk storage box of claim 1 wherein each said sliding compact disk carriage comprises a recessed receiving portion for receiving an individual compact disk.

5. The compact disk storage box of claim 4 wherein each said sliding compact disk carriage comprises two finger holes symmetrically provided at the border area of said recessed receiving portion at two opposite locations.

6. The compact disk storage box of claim 1 wherein said bottom shell comprises a plurality of upright hooks bilaterally raised from a top side wall thereof; said top cover shell comprises a plurality of recessed retaining portions corresponding to the upright hooks at said bottom shell; the holder bases of said individual compact disk holder units each comprise a plurality of top upright hooks and a plurality of bottom recessed retaining portions, the upright hooks of the holder base of one individual compact disk holder unit being respectively hooked on the recessed retaining portions at another individual compact disk holder unit or said top cover shell, the recessed retaining portions of the holder base of one individual compact disk holder unit being respectively forced into engagement with the upright hooks at another individual compact disk holder unit or said bottom shell.

7. The compact disk storage box of claim 1 wherein said top cover shell comprises a plurality of vertical locating holes symmetrically provided at two opposite lateral sides thereof for the positioning of substantially U-shaped clamps for enabling two combination compact disk storage boxes to be fastened together side by side.

* * * * *